United States Patent [19]

Halling

[11] 4,121,843
[45] Oct. 24, 1978

[54] MULTIPLE CONVOLUTION SEALING RING

[75] Inventor: Horace P. Halling, Laurel, Md.

[73] Assignee: Pressure Science, Incorporated, Beltsville, Md.

[21] Appl. No.: 839,187

[22] Filed: Oct. 4, 1977

[51] Int. Cl.² .............................................. F16J 15/08
[52] U.S. Cl. ................................. 277/200; 277/206 R; 277/236
[58] Field of Search ............ 277/200, 11, 205, 206 R, 277/213, 236, 214, 215

[56] References Cited

U.S. PATENT DOCUMENTS

| | | | |
|---|---|---|---|
| 2,631,908 | 3/1953 | Teetor | 277/200 |
| 3,192,690 | 7/1965 | Taylor | 277/205 X |
| 3,240,501 | 3/1966 | Smith | 277/206 R |
| 3,285,632 | 11/1966 | Dunkle | 277/11 X |
| 3,575,432 | 4/1971 | Taylor | 277/206 R X |
| 3,595,588 | 7/1971 | Rode | 277/206 R |
| 3,633,928 | 1/1972 | Smith | 277/206 R |
| 3,751,048 | 8/1973 | Rode | 277/200 |
| 3,761,102 | 9/1973 | Nicholson | 277/236 X |
| 3,797,836 | 3/1974 | Halling | 277/206 R X |
| 3,857,572 | 12/1974 | Taylor et al. | 277/206 R X |

Primary Examiner—Robert S. Ward, Jr.
Attorney, Agent, or Firm—Roylance, Abrams, Berdo & Farley

[57] ABSTRACT

There is disclosed a sealing ring comprising an integral piece of resilient metal formed into three or more U-shaped annular convolutions and having outer legs which extend from the convoluted section in a direction essentially parallel to but leading slightly away from the convolutions. The outer legs have a sinuous configuration and terminate in convex portions which define a sealing line when the sealing ring is installed.

9 Claims, 5 Drawing Figures

MULTIPLE CONVOLUTION SEALING RING

This invention relates to metal sealing rings which are used to confine fluid at high temperatures and pressures and which have the ability to accommodate for large variations in installed length of the seal due to dimensional tolerance accumulation and thermal expansion.

As known in the art, there are many applications, such as turbine nozzle and combustor assemblies in gas turbine aircraft engines where it is essential or desirable to effect sealing between annular components that are at variable axial distance from one another, depending upon manufacturing tolerances on several components in the assembly and thermal expansion during operation of the engine.

U.S. Pat. No. 3,797,836 discloses a sealing ring of approximate E-shape in radial cross section which is currently employed in applications such as that described in the previous paragraph. However, the use of that sealing ring is limited by the amount of axial deflection to which a seal of that configuration, with a given radial width, can be subjected without being plastically deformed or being prone to metal fatigue, when the ring is manufactured of a sufficient thickness to avoid rupture due to pressure stresses or deterioration due to oxidation. Moreover, said U.S. Pat. No. 3,797,836 teaches that there are two sealing lines when the seal is installed, i.e., a primary sealing line and a secondary sealing line.

It is an object of this invention to provide an improved sealing ring, having the more desirable attributes of the E-shaped sealing ring described in U.S. Pat. No. 3,797,836 and also having considerably increased deflection capability to accommodate large manufacturing tolerance accumulations and cyclic thermal expansion movements without loss of resilience or failure through fatigue.

It is another object of this invention to provide a seal which is especially useful in medium to large diameter high temperature nozzle and combustor assemblies, such as those encountered in turbine aircraft engines.

It is a further object of this invention to provide a sealing ring which when installed provides adequate sealing in a wide variety of applications relying upon a single sealing line.

These and other objects are accomplished by the practice of this invention which, briefly, concerns providing a sealing ring comprising an integral piece of resilient metal formed into three or more U-shaped annular convolutions (such as those found in a tubular flexible metal bellows) and having outer legs which extend from the convoluted section in a direction essentially parallel to but leading slightly away from the convolutions. Said outer legs have a sinuous configuration and terminate in convex portions which define a sealing line when the sealing ring is installed.

The invention will be more fully described by reference to the drawings wherein:

FIG. 1 is a partial radial sectional view showing the details of the sealing ring of this invention;

FIG. 2 is a partial radial sectional view showing a sealing ring as described in U.S. Pat. No. 3,797,836;

Figure 1:
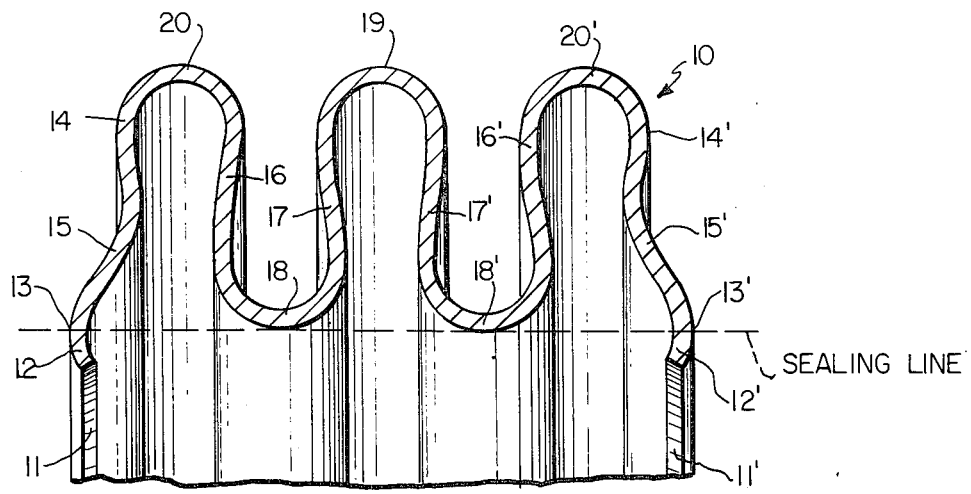

Referring to the drawings in detail and, more particularly, to FIG. 1, there is shown a sealing ring 10 having outer legs 11 and 11' which terminate in convex portions 12 and 12'. When installed in the cavity, the outermost portions 13 and 13' of these convex portions contact the wall of the cavity. Therefore, the points 13 and 13' define the sealing line when the sealing ring is installed in a cavity. Outer convex portions 14 and 14' are joined to convex portions 12 and 12' by concave portions 15 and 15'. The outer legs 11 and 11' flare out toward the bottom of the sealing ring so that the convex portions 12 and 12' are further apart than the convex portions 14 and 14'.

Separating the outer legs 11 and 11' are two U-shaped convolutions. Each U-shaped convolution comprises a leg 16 and 16' nearer to an outer leg 11 or 11' and a leg 17 and 17' more remote from the same outer leg. Legs 16 and 17 and leg 16' and 17' extend in generally parallel spaced side-by-side relation. Each U-shaped convolution further comprises a base 18 and 18' which is a 180° bend interconnecting legs 16 and 17 and legs 16' and 17'. The length of each convolution is approximately equal to the length of the outer legs at the sealing line. The two U-shaped convolutions are interconnected at the top of legs 17 and 17' by a 180° bend 19. Similarly, the outer legs 11 and 11' are interconnected at the top of legs 16-16' by 180° bends 20 and 20'.

There should be sufficient space between convolution crests 19, 20 and 20' and the bottom of the convolutions, 18 and 18' to prevent crushing of the sealing ring, resulting in high stress, when the ring is installed. Preferably, legs 16 and 17 and legs 16' and 17' are angled toward each other so that the 180° bends 19, 20 and 20' are larger than the spaces between the convolutions.

Although in the embodiment shown, a sealing ring in which only two U-shaped convolutions has been illustrated, there may be as many U-shaped convolutions as are required to insure that the seal will not fail as a result of overstressing due to deflection.

Figure 3:
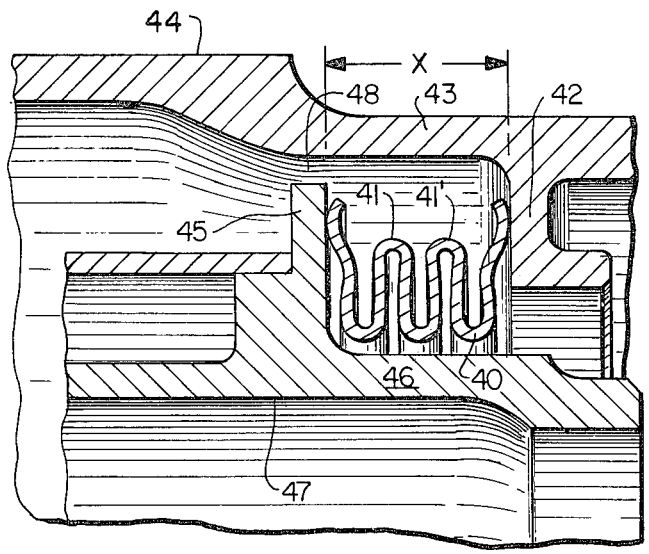
FIG. 3 is a partial radial sectional view taken through an aircraft engine assembly showing an installation in which the sealing ring of this invention has a particular utility.

FIG. 3 shows a typical installation for a sealing ring of this invention. The sealing ring is designated generally by reference numeral 40 and has a configuration similar to that previously described with respect to FIG. 1, except that it is an externally pressurized type rather than an internally pressurized type as shown in FIG. 1. Thus, whereas in FIG. 1, the base of each U-shaped convolution 18 and 18' and the convex portions 12 and 12' on the ends of the outer legs are on the inside of the ring, in FIG. 3 the base of each U-shaped convolution 41 and 41' and the convex portions on the ends of the outer legs on the ring are on the outside of the ring.

The sealing ring 40 is located in a cavity defined by a flange 42 and outer wall 43 of a large conduit pipe 44 and flange 45 and wall 46 of a smaller pipe 47 contained within the larger pipe 44. Fluid pressure is exerted through the channel 48 onto the outside portion of the seal. The dimension designated by the letter "X" in FIG. 3 is subject to build tolerance accumulation and relative thermal expansion of assembled components.

Figure 4:
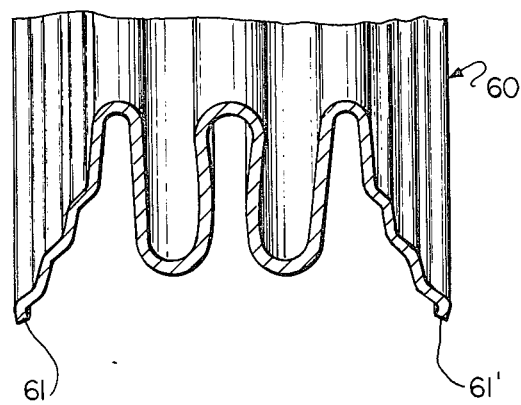
FIG. 4 is a view similar to FIG. 1 and shows another embodiment of the sealing ring of this invention.

FIG. 4 shows another externally pressurized seal designated generally by reference numeral 60 in which each outer leg 61 and 61' comprises multiple concave and convex concentric annular waves. Such a design is preferably employed in a sealing ring having a large cross-section and made of relatively thin material.

The purpose of the waves is to prevent circumferential rippling instability from being introduced during forming or during compression of the seal at installation.

Figure 5:
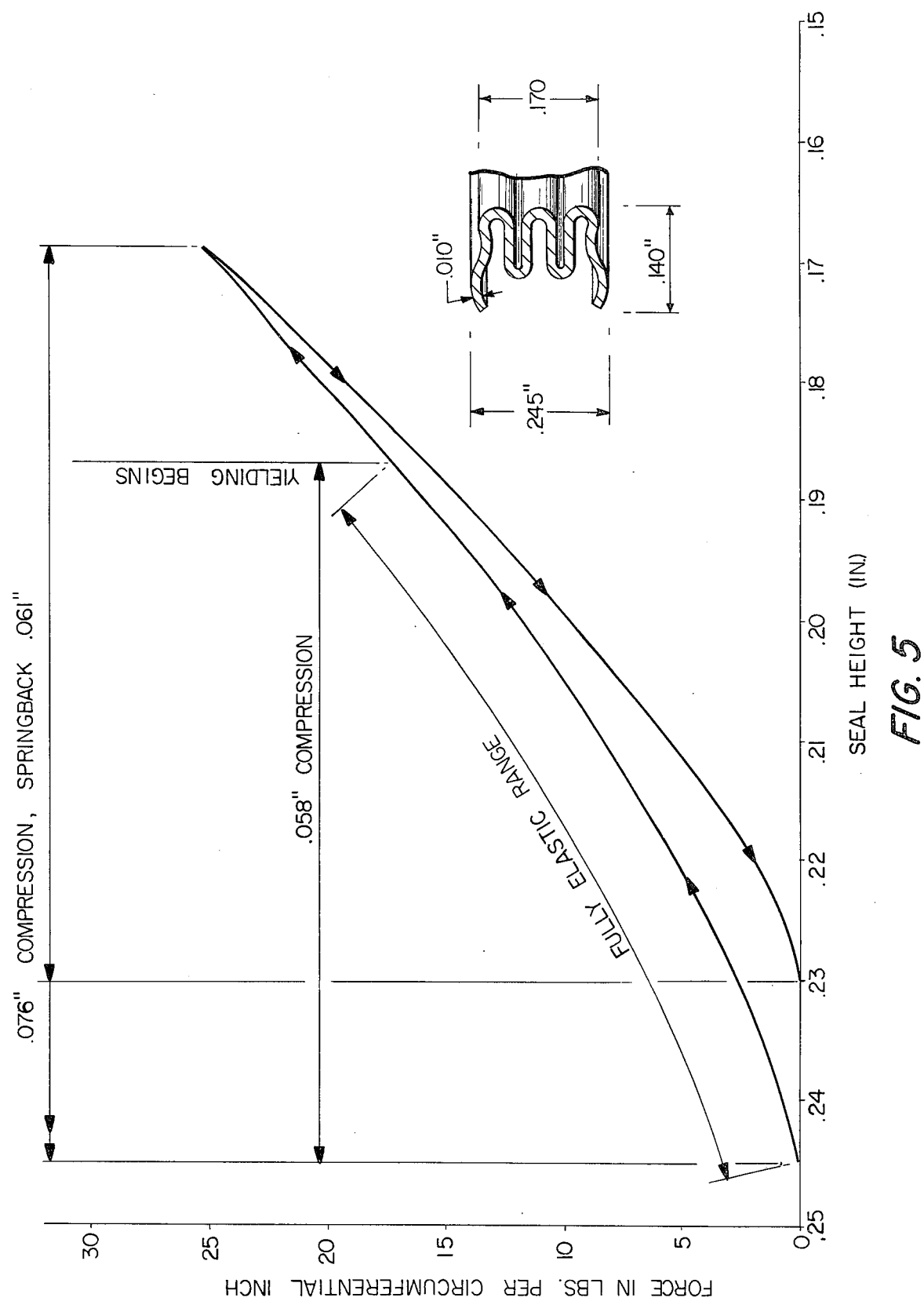
FIG. 5 is a force versus deflection graph showing a characteristic curve for compression of the sealing ring of this invention.

FIG. 5 shows the high deflection capability of a seal constructed in accordance with this invention. The cross-section of the seal used in the tests to obtain the test results set forth in FIG. 5 is shown in FIG. 5, the dimensions being as indicated. Thus, the thickness of the sheet metal from which the seal is made is 0.010 inch, the distance between the outermost portions of the convex parts on the end of the outer legs is 0.245 inch, the distance between the outermost portion of the convolution on the other end of the outer leg is 0.170 inch, and the length of each outer leg from one end to the other is 0.140 inch. When this seal is installed in a cavity such as shown in FIG. 3 and is subjected to fluid pressure, the seal is fully elastic up to a compression of 0.058 inch reduction in seal height, i.e., when the pressure is released, the seal will return to its original height of 0.245 inch. After that, the seal is not completely elastic. However, even at a compression of 0.076 inch in reduction in seal height, the seal will still spring back 0.061 inch to a height of 0.230 inch.

In accordance with this invention, it has been found that in order to gain a useful increase in deflection capability with a multi-convolution seal, it has been necessary to load the seal only at the edge of the ring so that there is only one sealing line when the seal is installed in a cavity. A lightly loaded single sealing line results in adequate sealing in a wide variety of applications for which it was heretofor considered necessary to use a heavier load or double sealing contact lines.

The sealing ring of this invention combines some of the advantages of a metal bellows and a face seal and may also be considered to be a combination of a metal bellows and conical disc spring encastre at one edge. The virtual conical disc spring end plates to this seal in combination with the bellows give the seal an unexpectedly high deflection capacity as shown by FIG. 5.

Figure 2:
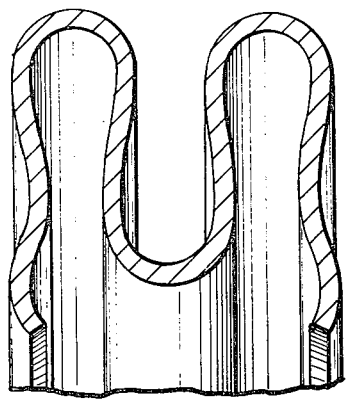

Although the concave portion, 15 and 15' in FIG. 1 is present in the prior art seal shown in FIG. 2, its function is different. Since there is no secondary sealing line in the seal of this invention, it is not necessary to have a concave portion to separate and define two sealing lines. However, the shape resulting from this concave portion is desirable since it prevents undesirable ripples or waves from being introduced into the sealing ring during manufacture. The concave radius of the invention may be between 0.1 inch and infinity, its actual size depending upon the cross-sectional dimensions of the sealing ring and the material being formed.

The seals of this invention may be constructed from metal such as, but not limited to, Inconel, stainless steel or Waspaloy and may be used without resort to plating where slight, controlled leakage is permissible or with special high temperature coatings, such as blistering resistant silver, where improved sealing in the low temperature part of the operating range is desired.

I claim:

1. A sealing ring comprising an integral piece of resilient metal formed into at least three U-shaped annular convolutions including two end convolutions and at least one inner convolution between said end convolutions, the outermost parts of the end convolutions forming legs which extend in a direction essentially parallel to but leading slightly away from the center line of symmetry of the ring cross-section; said outer legs having a sinuous configuration and terminating in convex portions which define, at each side of the seal, a singular sealing line when the seal is installed.

2. A sealing ring as defined in claim 1 wherein each of said outer legs comprises two convex portions joined together by a concave portion.

3. A sealing ring as defined in claim 1 wherein each of said outer legs comprises two convex portions joined together by a straight portion.

4. A sealing ring as defined in claim 1 comprising three of said convolutions and wherein said end convolutions are joined to said inner convolution by 180° bends.

5. A sealing ring as defined in claim 4 wherein said inner convolution has sides which are approximately equal to the length of the outer legs at said sealing line when the sealing ring is installed.

6. A sealing ring as defined in claim 5 wherein each of said convolutions has sides which are angled toward each other.

7. A sealing ring as defined in claim 1 which is designed to be externally pressurized.

8. A sealing ring as defined in claim 1 which is designed to be internally pressurized.

9. A sealing ring as defined in claim 1 wherein each of said outer legs comprises multiple concave and convex concentric annular waves.

* * * * *